United States Patent
Chen et al.

(10) Patent No.: US 10,127,428 B2
(45) Date of Patent: Nov. 13, 2018

(54) FINGERPRINT IDENTIFICATION METHOD AND FINGERPRINT IDENTIFICATION DEVICE

(71) Applicant: Gingy Technology Inc., Hsinchu (TW)

(72) Inventors: Tsung-Shan Chen, Hsinchu (TW); Chun-Lang Hung, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 0 days.

(21) Appl. No.: 15/844,630

(22) Filed: Dec. 18, 2017

(65) Prior Publication Data

US 2018/0107858 A1 Apr. 19, 2018

Related U.S. Application Data

(63) Continuation-in-part of application No. 15/208,619, filed on Jul. 13, 2016, now Pat. No. 9,977,947, which
(Continued)

(30) Foreign Application Priority Data

Aug. 26, 2014 (TW) .............................. 103129359 A
Dec. 22, 2014 (TW) .............................. 103144744 A
Aug. 17, 2017 (CN) .......................... 2017 1 0705439

(51) Int. Cl.
*G06K 9/00* (2006.01)
*H04N 1/60* (2006.01)

(52) U.S. Cl.
CPC ..... *G06K 9/00067* (2013.01); *G06K 9/00087* (2013.01); *H04N 1/6005* (2013.01); *H04N 1/6008* (2013.01)

(58) Field of Classification Search
None
See application file for complete search history.

(56) References Cited

U.S. PATENT DOCUMENTS

2008/0095412 A1* 4/2008 Fujieda .............. A61B 5/02007
382/124
2008/0253626 A1* 10/2008 Shuckers ........... G06K 9/00114
382/125

(Continued)

FOREIGN PATENT DOCUMENTS

CN 106326836 1/2017
TW I485629 5/2015

(Continued)

*Primary Examiner* — Sumati Lefkowitz
*Assistant Examiner* — David Perlman
(74) *Attorney, Agent, or Firm* — JCIPRNET

(57) ABSTRACT

A fingerprint identification method is provided. The fingerprint identification method includes following steps: obtaining an object image and storing a plurality of pixel data of the object image in a first color model format, where the pixel data include a plurality of first pixel values; converting the pixel data into a second color model format and obtaining a plurality of second pixel values based on the converted pixel data and a first gain value; calculating a plurality of third pixel values based on the first pixel values and the second pixel values; calculating a first standard deviation based on the third pixel values; and determining whether the first standard deviation being greater than a first preset threshold value, if the first standard deviation being greater than the first preset threshold value, recognizing the object image as a fingerprint image of a true finger.

18 Claims, 4 Drawing Sheets

Related U.S. Application Data is a continuation-in-part of application No. 14/835,130, filed on Aug. 25, 2015, and a continuation-in-part of application No. 14/978,237, filed on Dec. 22, 2015, now Pat. No. 9,770,199.

(60) Provisional application No. 62/486,954, filed on Apr. 18, 2017.

(56) References Cited

U.S. PATENT DOCUMENTS

| | | |
|---|---|---|
| 2013/0194236 A1 | 8/2013 | Gu et al. |
| 2014/0294262 A1* | 10/2014 | Schuckers .......... G06K 9/00114 |
| | | 382/125 |
| 2015/0078633 A1 | 3/2015 | Hung |
| 2017/0053108 A1* | 2/2017 | Jakobsson ........... H04L 63/0861 |
| 2017/0205893 A1* | 7/2017 | Burr ........................ G06F 3/017 |

FOREIGN PATENT DOCUMENTS

| | | |
|---|---|---|
| TW | I549065 | 9/2016 |
| TW | 201705031 | 2/2017 |

* cited by examiner

| Y(0,0) U(0,0) V(0,0) | Y(0,1) U(0,1) V(0,1) | Y(0,2) U(0,2) V(0,2) | Y(0,3) U(0,3) V(0,3) |
|---|---|---|---|
| Y(1,0) U(1,0) V(1,0) | Y(1,1) U(1,1) V(1,1) | Y(1,2) U(1,2) V(1,2) | Y(1,3) U(1,3) V(1,3) |
| Y(2,0) U(2,0) V(2,0) | Y(2,1) U(2,1) V(2,1) | Y(2,2) U(2,2) V(2,2) | Y(2,3) U(2,3) V(2,3) |
| Y(3,0) U(3,0) V(3,0) | Y(3,1) U(3,1) V(3,1) | Y(3,2) U(3,2) V(3,2) | Y(3,3) U(3,3) V(3,3) |

⎯ 310

| R(0,0) G(0,0) B(0,0) | R(0,1) G(0,1) B(0,1) | R(0,2) G(0,2) B(0,2) | R(0,3) G(0,3) B(0,3) |
|---|---|---|---|
| R(1,0) G(1,0) B(1,0) | R(1,1) G(1,1) B(1,1) | R(1,2) G(1,2) B(1,2) | R(1,3) G(1,3) B(1,3) |
| R(2,0) G(2,0) B(2,0) | R(2,1) G(2,1) B(2,1) | R(2,2) G(2,2) B(2,2) | R(2,3) G(2,3) B(2,3) |
| R(3,0) G(3,0) B(3,0) | R(3,1) G(3,1) B(3,1) | R(3,2) G(3,2) B(3,2) | R(3,3) G(3,3) B(3,3) |

⎯ 320

| △YR(0,0) △YG(0,0) △YB(0,0) | △YR(0,1) △YG(0,1) △YB(0,1) | △YR(0,2) △YG(0,2) △YB(0,2) | △YR(0,3) △YG(0,3) △YB(0,3) |
|---|---|---|---|
| △YR(1,0) △YG(1,0) △YB(1,0) | △YR(1,1) △YG(1,1) △YB(1,1) | △YR(1,2) △YG(1,2) △YB(1,2) | △YR(1,3) △YG(1,3) △YB(1,3) |
| △YR(2,0) △YG(2,0) △YB(2,0) | △YR(2,1) △YG(2,1) △YB(2,1) | △YR(2,2) △YG(2,2) △YB(2,2) | △YR(2,3) △YG(2,3) △YB(2,3) |
| △YR(3,0) △YG(3,0) △YB(3,0) | △YR(3,1) △YG(3,1) △YB(3,1) | △YR(3,2) △YG(3,2) △YB(3,2) | △YR(3,3) △YG(3,3) △YB(3,3) |

FINGERPRINT IDENTIFICATION METHOD AND FINGERPRINT IDENTIFICATION DEVICE

CROSS-REFERENCE TO RELATED APPLICATION

This application is a continuation-in-part application of and claims the priority benefit of a prior application Ser. No. 15/208,619, filed on Jul. 13, 2016, now pending. The prior application Ser. No. 15/208,619 is a continuation-in-part application of and claims the priority benefit of a prior application Ser. No. 14/835,130, filed on Aug. 25, 2015, now pending, which claims the priority benefits of Taiwan application serial no. 103129359, filed on Aug. 26, 2014. The prior application Ser. No. 15/208,619 is also a continuation-in-part application of and claims the priority benefit of a prior application Ser. No. 14/978,237, filed on Dec. 22, 2015, now patented, which claims the priority benefits of Taiwan application serial no. 103144744, filed on Dec. 22, 2014. This application also claims the priority benefits of U.S. provisional application Ser. No. 62/486,954, filed on Apr. 18, 2017 and China application serial no. 201710705439.8, filed on Aug. 17, 2017. The entirety of each of the above patent applications is hereby incorporated by reference herein and made a part of this specification.

BACKGROUND OF THE INVENTION

1. Field of the Invention

The invention relates to an identification technology. More particularly, the invention relates to a fingerprint identification method and a fingerprint identification device.

2. Description of Related Art

Types of biometric identification include face, voice, iris, retina, vein, and fingerprint identifications. Every individual has a unique fingerprint. Moreover, changes of an individual's age or health condition do not easily change the fingerprint. Therefore, the fingerprint identification device has become one of the most popular biometric identification systems nowadays. The fingerprint identification device may further be categorized into the optical, capacitive, ultrasonic, and thermal induction identification devices according to different sensing methods.

Nevertheless, a conventional fingerprint identification device is unable to effectively identify differences between a real fingerprint and a fake fingerprint. As a result, criminals tend to fabricate fake fingers usually with silicon gel, and the fake fingerprints and ports are also fabricated on the fake fingers. When a fake finger made of the silicon gel and having the fake fingerprints and pores is pressed on a conventional fingerprint identification device, the fake finger showing the characteristics of fingerprints, pores, and finger deformation caused by the pressing action may deceive the conventional fingerprint identification device. Furthermore, the conventional fingerprint identification device is unable to correctly identify whether the pressing action is performed by a true finger, leading to a loophole in identification as a result. Therefore, solutions are provided in the following exemplary embodiments of the invention.

SUMMARY OF THE INVENTION

The invention provides a fingerprint identification device and a fingerprint identification method for providing favorable fingerprint identification function and also effectively identify whether an object image is a fingerprint image of a true finger, so as to effectively prevent a fake finger from passing the identification.

In an exemplary embodiment of the invention, the fingerprint identification method is suitable for the fingerprint identification device. The fingerprint identification method includes following steps: obtaining an object image and storing a plurality of pixel data of the object image in a first color model format, wherein the pixel data include a plurality of first pixel values; converting the pixel data into a second color model format and obtaining a plurality of second pixel values based on the converted pixel data and a first gain value; calculating a plurality of third pixel values based on the first pixel values and the second pixel values; calculating a first standard deviation based on the third pixel values; and determining whether the first standard deviation being greater than a first preset threshold value, if the first standard deviation being greater than the first preset threshold value, recognizing the object image as a fingerprint image of a true finger.

A fingerprint identification device provided by an exemplary embodiment of the invention includes a storage device, a fingerprint sensor, and a processor. The fingerprint sensor is configured to capture an object image. The processor is coupled to the fingerprint sensor and the storage device. The processor is configured to receive the object image and store a plurality of pixel data of the object image in a first color model format to the storage device. The processor converts the pixel data into a second color model format, and the processor obtains a plurality of second pixel values based on the converted pixel data and a first gain value. The processor calculates a plurality of third pixel values based on the first pixel values and the second pixel values, and the processor calculates a first standard deviation based on the third pixel values. The processor determines whether the first standard deviation is greater than a first preset threshold value, if the first standard deviation is greater than the first preset threshold value, the processor recognizes the object image as a fingerprint image of a true finger.

To sum up, the fingerprint identification device and the fingerprint identification method provided by the exemplary embodiments of the invention may analyze and calculate at least one partial object image of the object image, so as to obtain the standard deviations of the specific pixel values after being calculated of the object image. Moreover, the fingerprint identification device provided by the exemplary embodiments of the invention may determine the values of the standard deviations through the preset threshold values, so as to determine that whether the object image belongs to the fingerprint image of the true finger for preventing a fake finger from passing the identification.

To make the aforementioned and other features and advantages of the invention more comprehensible, several exemplary embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
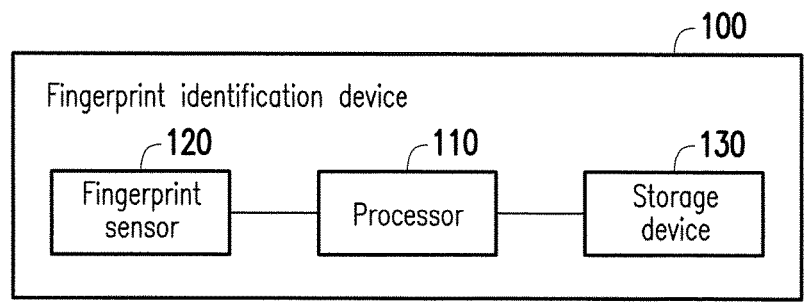
FIG. 1 illustrates a block diagram of a fingerprint identification device according to an exemplary embodiment of the invention.

In order to make the invention more comprehensible, several exemplary embodiments of the invention are introduced herein to describe the invention, but the invention is not limited by the exemplary embodiments. Suitable combinations among the exemplary embodiments are also allowed. Moreover, elements/components/steps with the same reference numerals are used to represent the same or similar parts in the drawings and exemplary embodiments.

FIG. 1 illustrates a block diagram of a fingerprint identification device according to an exemplary embodiment of the invention. Referring to FIG. 1, in the present exemplary embodiment, a fingerprint identification device 100 includes a processor 110, a fingerprint sensor 120, and a storage device 130. The processor 110 is coupled to the fingerprint sensor 120 and the storage device 130. In the present exemplary embodiment, the fingerprint sensor 120 is configured to capture an object image and provides the object image to the processor 110, and that the processor 110 analyzes the object image. The storage device 130 stores a plurality of program modules. The processor 110 may read the program modules of the storage device 130, and that the fingerprint identification method described in each of the exemplary embodiments of the invention is thereby realized. In addition, the fingerprint sensor 120 may include a light source, an optical receiver, and other similar optical fingerprint sensing elements in the present exemplary embodiment, but the invention is not limited thereto. In an exemplary embodiment, the fingerprint sensor 120 may also include a capacitive or another type of fingerprint sensing element.

In the present exemplary embodiment, the processor 110 may be, for example, a central processing unit (CPU), a system on chip (SOC), or a programmable microprocessor for general or special use, a digital signal processor (DSP), a programmable controller, an application specific integrated circuit (ASIC), a programmable logic device (PLD), another similar processing device, or a combination of the foregoing devices.

In the present exemplary embodiment, the storage device 130 is, for example, a fixed or a movable random access memory (RAM) in any form, a read-only memory (ROM), a flash memory, or another similar device, or a combination of the foregoing devices. In the present exemplary embodiment, the storage device 130 is configured to store object image data, program modules, etc. provided by each of the exemplary embodiments of the invention, such that the processor 110 may read the storage device 130 and execute the data and the program modules, and the fingerprint identification method provided by each of the exemplary embodiments of the invention is thereby realized.

Figure 2:
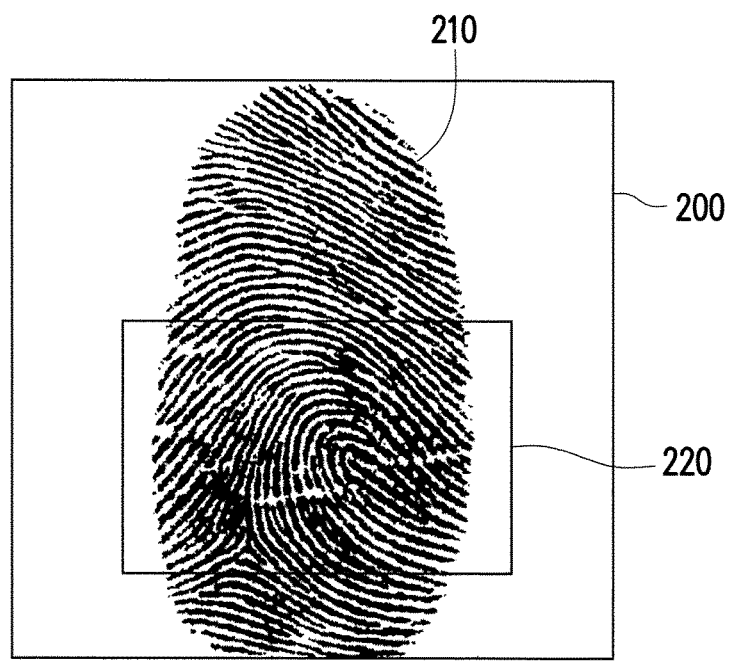
FIG. 2 illustrates a schematic diagram of an object image according to an exemplary embodiment of the invention.

FIG. 2 illustrates a schematic diagram of an object image according to an exemplary embodiment of the invention. Referring to FIG. 1 and FIG. 2, in the present exemplary embodiment, an object image 200 includes a plurality of pixel data, and the object image 200 may be a complete object image. In the present exemplary embodiment, the fingerprint sensor 120 provides the object image 200 to the processor 110, and the processor 110 stores the pixel data of the object image 200 in a first color model format. In the present exemplary embodiment, the first color model format is a YUV color model format, but the invention is not limited thereto. In an exemplary embodiment, the first color model format may also be a color model format of another type.

In the present exemplary embodiment, the object image 200 captured by the fingerprint sensor 120 may be a complete object image, and a fingerprint 210, for example, may be included in the object image 200. Nevertheless, the processor 110 may capture a portion of the object image 200 for analyzing in the present exemplary embodiment. In other words, the processor 110 may sample a partial object image 220 of the object image 200 and performs following image analysis and identification operations for the partial object image 220. For instance, the object image 200 may, for example, have a pixel number of 320×240, and the partial object image 220 may, for example, have a pixel number of 60×60. The processor 110 may capture the partial object image 220 presenting a central position or a position with an important feature of the object image 200. The invention is not limited thereto. As such, the processor 110 of the present exemplary embodiment may require less operation to perform image analysis and may effectively determine that whether the object image is a fingerprint image of a true finger as well.

Figure 3:
FIG. 3 illustrates a schematic diagram of a color model format of pixel data of a converted object image according to an exemplary embodiment of the invention.

FIG. 3 illustrates a schematic diagram of a color model format of pixel data of a converted object image according to an exemplary embodiment of the invention. Referring to FIG. 1 to FIG. 3, in the present exemplary embodiment, the processor 110 may analyze the partial object image 220, so as to obtain pixel data Y(0,0)/U(0,0)/V(0,0) to Y(3,3)/U(3,3)/V(3,3) of each of pixels in the partial object image 220. Specifically, as shown in a data matrix 310 of FIG. 3, the partial object image 220, for example, has a pixel number of 4×4. In the present exemplary embodiment, the pixel data Y(0,0)/U(0,0)/V(0,0) to Y(3,3)/U(3,3)/V(3,3) of each of the pixels in the partial object image 220 are data of a YUV color model format. Moreover, the processor 110 may convert the pixel data Y(0,0)/U(0,0)/V(0,0) to Y(3,3)/U(3,3)/V(3,3) into a second color model format based on the following formula (1) to formula (3), wherein the second color model format is, for example, a RGB color model format, but the invention is not limited thereto. In an exemplary embodiment, the second color model format may also be a color model format of another type. Formula (1) to formula (3) are presented as follows:

$$R = Y + 1.13983 * (V - 128) \qquad (1)$$

$$G = Y - 0.39465 * (U - 128) - 0.58060 * (V - 128) \qquad (2)$$

$$B = Y + 2.03211 * (U - 128) \qquad (3)$$

Therefore, as shown in a data matrix 320 of FIG. 3, the processor 110 coverts the pixel data Y(0,0)/U(0,0)/V(0,0) to Y(3,3)/U(3,3)/V(3,3) into a plurality of pixel data R(0,0)/G(0,0)/B(0,0) to R(3,3)/G(3,3)/B(3,3) of the RGB color model format. Moreover, in an exemplary embodiment, the processor 110 may further adjust the pixel data R(0,0)/G(0,0)/B(0,0) to R(3,3)/G(3,3)/B(3,3) through different gain values, so as to perform analysis operations through the pixel data having the gain values adjusted.

Figures 4A, 4B, 5:
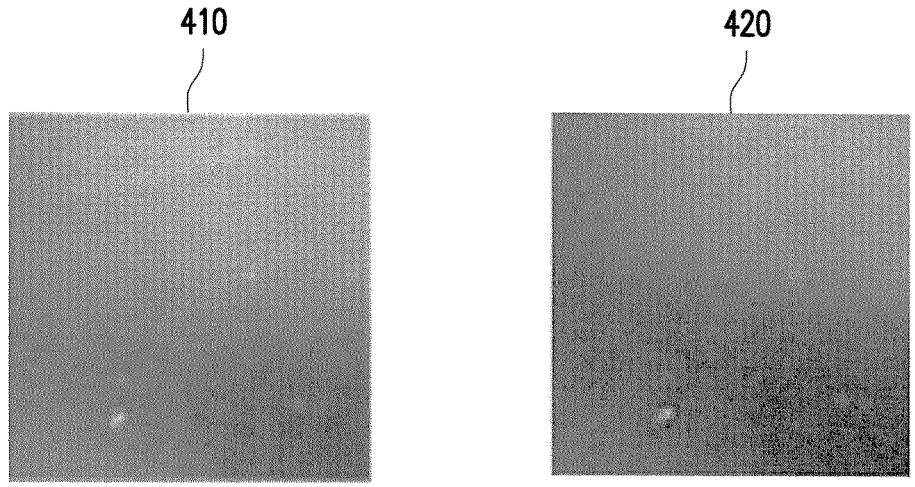
FIG. 4A illustrates a schematic diagram of adjusting an object image based on a first gain value according to an exemplary embodiment of the invention.
FIG. 4B illustrates a schematic diagram of adjusting an object image based on a second gain value according to an exemplary embodiment of the invention.
FIG. 5 illustrates a schematic diagram of calculating pixel data of an object image according to an exemplary embodiment of the invention.

FIG. 4A illustrates a schematic diagram of adjusting an object image based on a first gain value according to an exemplary embodiment of the invention. FIG. 4B illustrates a schematic diagram of adjusting an object image based on a second gain value according to an exemplary embodiment of the invention. Referring to FIG. 1 to FIG. 4B, for instance, the processor 110 may respectively adjust the pixel data R(0,0)/G(0,0)/B(0,0) to R(3,3)/G(3,3)/B(3,3) of the data matrix 320 of FIG. 3, for example, through a first gain value and a second gain value. In the present exemplary embodiment, the first gain value may be, for example, a RGB gain of 1:1:1, and the second gain value may be, for example, a RGB gain of 1:2:2, but the invention is not limited thereto. As such, an adjusted partial object image 410 may be an image with lighter colors, and an adjusted partial object image 420 may be an image with darker colors. Nevertheless, ratios of the gain values of the invention are not limited to the above, in an exemplary embodiment, the ratio of the first gain value to the second gain value may be determined according to different requirements or requirements from fingerprint identification equipment.

FIG. 5 illustrates a schematic diagram of calculating pixel data of an object image according to an exemplary embodiment of the invention. Referring to FIG. 1 to FIG. 5, in the present exemplary embodiment, after the pixel data R(0,0)/G(0,0)/B(0,0) to R(3,3)/G(3,3)/B(3,3) are adjusted through the first gain value, the processor 110 may calculate the pixel data of the respective pixel based on the following formula (4) to formula (6). Formula (4) to formula (6) are presented as follows:

$$\Delta YR(i,j) = Y(i,j) - R(i,j) \quad (4)$$

$$\Delta YG(i,j) = Y(i,j) - G(i,j) \quad (5)$$

$$\Delta YB(i,j) = Y(i,j) - B(i,j) \quad (6)$$

In formula (4) to formula (6), i and j are integers greater than or equal to 0. As such, as shown in a data matrix 510 of FIG. 5, the processor 110 may obtain a plurality of pixel data $\Delta YR(0,0)/\Delta YG(0,0)/\Delta YB(0,0)$ to $\Delta YR(3,3)/\Delta YG(3,3)/\Delta YB(3,3)$.

Note that in the present exemplary embodiment, the processor 110 calculates a standard deviation based on pixel values of at least one type of the pixel data $\Delta YR(0,0)/\Delta YG(0,0)/\Delta YB(0,0)$ to $\Delta YR(3,3)/\Delta YG(3,3)/\Delta YB(3,3)$. For instance, first, in the processor 110, brightness values Y(0,0) to Y(3,3) of each of the pixels in the data matrix 310 of FIG. 3 act as a plurality first pixel values, and red pixel values R(0,0)~R(3,3) of each of the pixels in the data matrix 320 of FIG. 3 act as a plurality of second pixel values after being adjusted through the first gain value. Next, the processor 110 respectively subtracts the second pixel values from the first pixel values so as to obtain a plurality of pixel values $\Delta YR(0,0)$ to $\Delta YR(3,3)$ of each of the pixels in the data matrix 510 of FIG. 5. The pixel values $\Delta YR(0,0)$ to $\Delta YR(3,3)$ act as a plurality third pixel values in the processor 110, and the processor 110 calculates a first standard deviation of the third pixel values based on the following formula (7) and formula (8). Formula (7) and formula (8) are presented as follows:

$$SD = \sqrt{\frac{1}{N}\sum_{k=1}^{N}(X_k - \mu)^2} \quad \text{Formula (7)}$$

$$\mu = \frac{1}{16}\sum_{k=1}^{16} X_k \quad \text{Formula (8)}$$

In the above formula (7) and formula (8), $X_k$ is $\Delta YR(0,0)$ to $\Delta YR(3,3)$. As such, the processor 110 may obtain a standard deviation SD(R) corresponding to the pixel values $\Delta YR(0,0)$ to $\Delta YR(3,3)$. In the present exemplary embodiment, the processor 110 determines that whether the standard deviation SD(R) is greater than a first preset threshold value. If the standard deviation SD(R) is greater than the first preset threshold value, the processor 110 recognizes the object image 200 as a fingerprint image of a true finger. In other words, as the fingerprint image of the true finger has a specific color of skin color, the object image may thereby be effectively recognized as the fingerprint image of the true finger or a fake finger through calculating the standard deviation of related specific pixel values.

In the present exemplary embodiment, the standard deviation SD(R) of the red pixel value of the fingerprint image of the true finger is likely to be greater than the first preset threshold value after the above adjustment and calculation are performed. On the contrary, the standard deviation SD(R) of the red pixel value of the fingerprint image of the fake finger is not going to be greater than the first preset threshold value after the above adjustment and calculation are performed. The fingerprint identification device 100 provided by the present exemplary embodiment may therefore be able to identify whether the object image is the fingerprint image of the true finger according to the above identification method.

For another instance, the above calculation method for the standard deviation may also be applied to calculate a second standard deviation. First, in the processor 110, the brightness values Y(0,0) to Y(3,3) of the respective pixel in the data matrix 310 of FIG. 3 act as the first pixel values and green pixel values G(0,0) to G(3,3) of the respective pixel in the data matrix 320 of FIG. 3 act as a plurality of fourth pixel values after being adjusted through the second gain value. Next, the processor 110 respectively subtracts the fourth pixel values from the first pixel values, so as to obtain a plurality of pixel values $\Delta YG(0,0)$ to $\Delta YG(3,3)$ of each of the pixels in the data matrix 510 of FIG. 5. In the processor 110, the pixel values $\Delta YG(0,0)$ to $\Delta YG(3,3)$ act as a plurality fifth pixel values, and moreover, the processor 110 calculates standard deviations SD(G) of the fifth pixel values based on the above formula (7) and formula (8).

As such, the processor 110 may obtain the standard deviations SD(G) corresponding to the pixel values $\Delta YG(0,0)$ to $\Delta YG(3,3)$. In the present exemplary embodiment, the processor 110 determines that whether the standard deviation SD(G) is greater than a second preset threshold value. If the standard deviation SD(G) is greater than the second preset threshold value, the processor 110 recognizes the object image 200 as the fingerprint image of the true finger. In other words, as the fake finger may have skin color as well, and thus, besides the standard deviations SD(R) calculated through the third pixel values adjusted by the first gain value, the fingerprint identification device 100 provided by the invention may further determine the standard deviations SD(G) calculated through the fifth pixel values adjusted by the second gain value, so as to effectively prevent the fake finger with skin color from passing identification.

In the present exemplary embodiment, the standard deviation SD(G) of the green pixel value of the fingerprint image of the true finger is likely to be greater than the second preset threshold value after performing the above adjustment and calculation. On the contrary, the standard deviation SD(G) of the green pixel value of the fingerprint image of the fake finger is not going to be greater than the second preset threshold value after performing the above adjustment and calculation. The fingerprint identification device 100 provided by the present exemplary embodiment may therefore be able to identify whether the object image is the fingerprint image of the true finger according to the above identification method.

Experimental results of a plurality of samples in Table 1 are further provided as follows to assist in explaining the foregoing exemplary embodiment examples.

TABLE 1

| Samples | GAIN A | | | GAIN B | | | Results |
| --- | --- | --- | --- | --- | --- | --- | --- |
| | SD(R) | SD(G) | SD(B) | SD(R) | SD(G) | SD(B) | |
| FAKE1 | 3 | 13 | 38 | 5 | 61 | 37 | FAIL |
| FAKE2 | 3 | 15 | 37 | 5 | 61 | 37 | FAIL |
| FAKE3 | 83 | 5 | 120 | 2 | 47 | 46 | FAIL |
| FAKE4 | 124 | 1 | 97 | 2 | 123 | 42 | FAIL |
| FAKE5 | 2 | 92 | 43 | 122 | 1 | 62 | FAIL |
| FAKE6 | 1 | 81 | 44 | 95 | 1 | 96 | FAIL |
| FAKE7 | 76 | 1 | 43 | 3 | 124 | 41 | FAIL |
| TRUE | 30 | 1 | 41 | 3 | 8 | 40 | PASS |

Identification results of a plurality of samples are taken as examples for explanation. According to Table 1, the samples include Sample FAKE1 to Sample FAKE7 and Sample TRUE. In the present exemplary embodiment, through the calculations of the standard deviations described in the foregoing exemplary embodiments, the processor 110 obtains the red, green, and blue pixel values of each of the pixels respectively adjusted through the first gain value (GAIN A) and the second gain value (GAIN B) of the partial object images of the samples and the standard deviations calculated through corresponding brightness values.

For instance, in the present exemplary embodiment, the processor 110 may respectively determine whether the standard deviations SD(R) of the first gain values (GAIN A) of the samples are greater than or equal to a preset threshold value of 30. Moreover, the processor 110 further respectively determines whether the standard deviations SD(G) of the second gain values (GAIN B) of the samples are lower than the preset threshold value of 30. In other words, the processor 110 may identify whether the image is captured from a true finger through different levels of color cast. Therefore, in the foregoing Table 1, since only the Sample TRUE satisfies conditions of the two standard deviations, the processor 110 may determine that the Sample TRUE is the fingerprint image of the true finger. Nevertheless, in an exemplary embodiment, the processor 110 may also set plural preset threshold values, so as to respectively determine that the standard deviations of other pixel values being adjusted through different gain values through the preset threshold values. Alternatively, the processor 110 may set one or several preset threshold values, so as to determine the standard deviations of at least one pixel value after being adjusted through single gain value, but the invention is not limited thereto.

Note that after the object image 200 passes the foregoing identification operations, the fingerprint identification device 100 may further perform a fingerprint authentication operation for the object image 200, so as to determine that whether the fingerprint features in the object image 200 match the fingerprint features registered by the fingerprint identification device 100 in advance. People having ordinary skill in the art may acquire sufficient teachings, suggestions, and other details related to the fingerprint authentication operation described in each of the exemplary embodiments of the invention, and that detailed descriptions are not further provided hereinafter.

Figure 6:
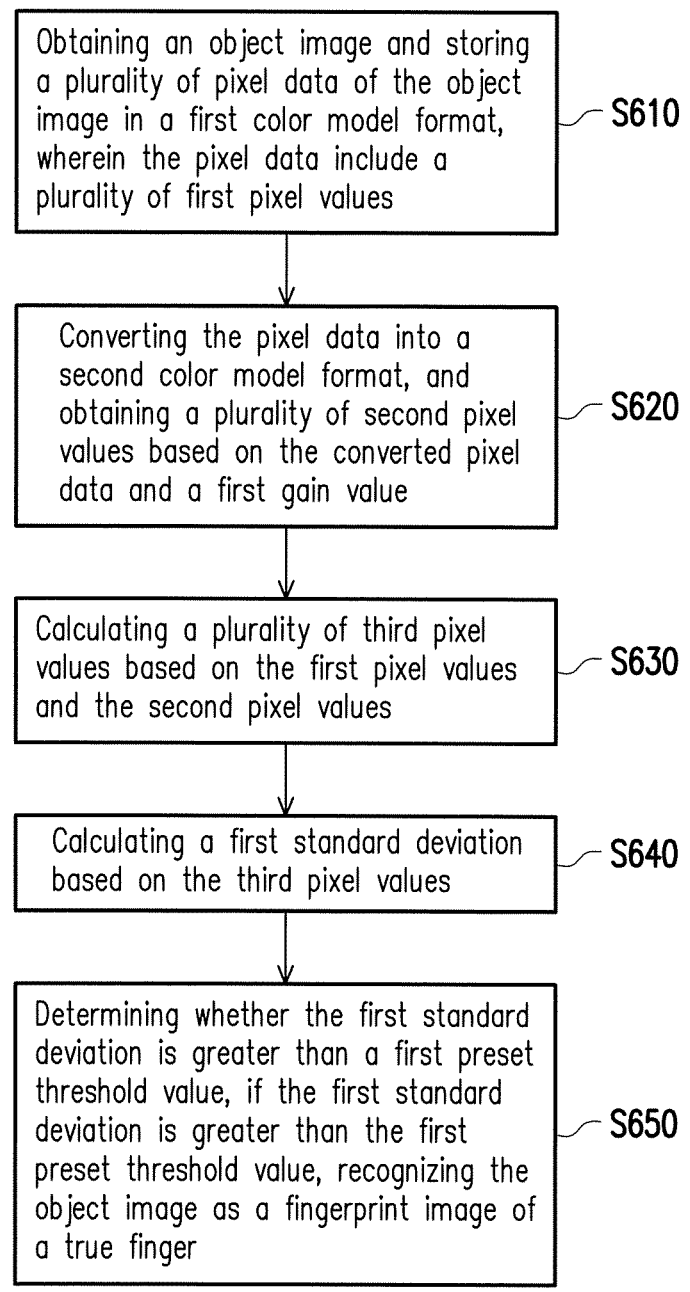
FIG. 6 illustrates a flowchart of a fingerprint identification method according to an exemplary embodiment of the invention.

FIG. 6 illustrates a flowchart of a fingerprint identification method according to an exemplary embodiment of the invention. Referring to FIG. 1 and FIG. 6, a fingerprint identification method of FIG. 6 is at least suitable for the fingerprint identification device 100 of FIG. 1. In step S610, the processor 110 obtains an object image through the fingerprint sensor 120 and stores a plurality of pixel data of the object image in the first color model format to the storage device 130, wherein the pixel data include a plurality of first pixel values. In step S620, the processor 110 converts the pixel data into the second color model format and obtains a plurality of second pixel values based on the converted pixel data and the first gain value. In step S630, the processor 110 calculates a plurality of third pixel values based on the first pixel values and the second pixel values. In step S640, the processor 110 calculates a first standard deviation based on the third pixel values. In step S650, the processor 110 determines that whether the first standard deviation is greater than a first preset threshold value and recognizes the object image as a fingerprint image of a true finger if the first standard deviation is greater than the first preset threshold value. The fingerprint identification method provided by the present exemplary embodiment may therefore be able to effectively identify whether the object image is the fingerprint image of the true finger, so as to effectively prevent a fake finger from passing the identification.

In addition, for the related exemplary embodiments and element features of the fingerprint identification device 100, enough teaching, suggestion, and implementation illustration are obtained from the above exemplary embodiments of FIG. 1 to FIG. 5, and that detailed descriptions are not further provided hereinafter.

In view of the foregoing, the fingerprint identification device and the fingerprint identification method provided by the exemplary embodiments of the invention may capture at least one partial object image of the object image for performing analysis. First, in the fingerprint identification device provided by the exemplary embodiments of the invention, the pixel values of the partial object image may be adjusted through different gain values. Next, the fingerprint identification device of the exemplary embodiments of the invention may further calculate the pixel values of the partial object image for obtaining the standard deviations corresponding to the pixel values. Finally, the fingerprint identification device provided by the exemplary embodiments of the invention may determine the values of the standard deviations through the preset threshold values, so as to determine that whether the object image belongs to the fingerprint image of the true finger. As such, the fingerprint identification device and the fingerprint identification method provided by the exemplary embodiments of the invention may effectively prevent a fake finger from passing fingerprint identification.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fingerprint identification method, comprising:
   obtaining an object image by a fingerprint sensor, and storing a plurality of pixel data of the object image in a first color model format by a memory, wherein the pixel data comprise a plurality of first pixel values;
   converting the pixel data into a second color model format by a processor, and obtaining a plurality of second pixel values based on the converted pixel data and a first gain value by the processor;
   calculating a plurality of third pixel values based on the first pixel values and the second pixel values by the processor;
   calculating a first standard deviation based on the third pixel values by the processor; and
   determining whether the first standard deviation is greater than a first preset threshold value by the processor, if the first standard deviation is greater than the first preset threshold value, recognizing the object image as a fingerprint image of a true finger by the processor,
   wherein the step of calculating the third pixel values based on the first pixel values and the second pixel values comprises:
   subtracting the second pixel values from the first pixel values for obtaining the third pixel values by the processor.

2. The fingerprint identification method as claimed in claim 1, wherein the first color model format is a YUV color model format.

3. The fingerprint identification method as claimed in claim 1, wherein the first pixel values are a plurality of brightness values.

4. The fingerprint identification method as claimed in claim 1, wherein the second color model format is a RGB color model format.

5. The fingerprint identification method as claimed in claim 1, wherein the second pixel values and the third pixel values are a plurality of red pixel values, and the first standard deviation is a red pixel value standard deviation.

6. The fingerprint identification method as claimed in claim 1, wherein the step of capturing the object image, and storing the pixel data of the object image in the first color model format comprises:
   capturing a complete object image by the fingerprint sensor, and sampling a portion of the complete object image to act as the object image by the processor.

7. The fingerprint identification method as claimed in claim 1, further comprising:
   obtaining a plurality of fourth pixel values based on the converted pixel data and a second gain value by the processor;
   calculating a plurality of fifth pixel values based on the first pixel values and the fourth pixel values by the processor; and
   calculating a second standard deviation based on the fifth pixel values by the processor.

8. The fingerprint identification method as claimed in claim 7, wherein, the step of determining whether the first standard deviation is greater than the first preset threshold value by the processor, if the first standard deviation is greater than the first preset threshold value, recognizing the object image as the fingerprint image of the true finger by the processor comprises:
   further determining whether the second standard deviation is less than a second preset threshold value by the processor, if the second standard deviation is less than the second preset threshold value, recognizing the object image as the fingerprint image of the true finger by the processor.

9. The fingerprint identification method as claimed in claim 7, wherein the fourth pixel values and the fifth pixel values are a plurality of green pixel values, and the second standard deviation is a green pixel value standard deviation.

10. A fingerprint identification device, comprising:
    a memory;
    a fingerprint sensor configured to capture an object image; and
    a processor coupled to the fingerprint sensor and the memory, the processor is configured to receive the object image and store a plurality of pixel data of the object image to the memory in a first color model format,
    wherein the processor converts the pixel data into a second color model format, and the processor obtains a plurality of second pixel values based on the converted pixel data and a first gain value,
    wherein the processor calculates a plurality of third pixel values based on the first pixel values and the second pixel values, and the processor calculates a first standard deviation based on the third pixel values
    wherein the processor determines whether the first standard deviation is greater than a first preset threshold value, if the first standard deviation is greater than the first preset threshold value, the processor recognizes the object image as a fingerprint image of a true finger,
    wherein the processor respectively subtracts the second pixel values from the first pixel values for obtaining the third pixel values.

11. The fingerprint identification device as claimed in claim 10, wherein the first color model format is a YUV color model format.

12. The fingerprint identification device as claimed in claim 10, wherein the first pixel values are a plurality of brightness values.

13. The fingerprint identification device as claimed in claim 10, wherein the second color model format is a RGB color model format.

14. The fingerprint identification device as claimed in claim 10, wherein the second pixel values and the third pixel values are a plurality of red pixel values, and the first standard deviation is a red pixel value standard deviation.

15. The fingerprint identification device as claimed in claim 10, wherein the processor captures a complete object image, and the processor samples a portion of the complete object image to act as the object image.

16. The fingerprint identification device as claimed in claim 10, wherein the processor obtains a plurality of fourth pixel values based on the converted pixel data and a second gain value, and the processor calculates a plurality of fifth pixel values based on the first pixel values and the fourth pixel values,
    wherein the processor calculates a second standard deviation based on the fifth pixel values.

17. The fingerprint identification device as claimed in claim 16, wherein the processor further determines whether the second standard deviation is less than a second preset threshold value, if the second standard deviation is less than the second preset threshold value, the processor recognizes the object image as the fingerprint image of the true finger.

18. The fingerprint identification device as claimed in claim 16, wherein the fourth pixel values and the fifth pixel values are a plurality of green pixel values, and the second standard deviation is a green pixel value standard deviation.

\* \* \* \* \*